(12) United States Patent
Tsuneki et al.

(10) Patent No.: US 11,521,119 B2
(45) Date of Patent: Dec. 6, 2022

(54) MACHINE LEARNING DEVICE, CONTROL DEVICE, AND MACHINE LEARNING METHOD

(71) Applicant: FANUC CORPORATION, Yamanashi (JP)

(72) Inventors: Ryoutarou Tsuneki, Yamanashi (JP); Satoshi Ikai, Yamanashi (JP); Yuuki Shirakawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 398 days.

(21) Appl. No.: 16/550,606

(22) Filed: Aug. 26, 2019

(65) Prior Publication Data
US 2020/0104743 A1    Apr. 2, 2020

(30) Foreign Application Priority Data

Oct. 2, 2018    (JP) .............................. JP2018-187588

(51) Int. Cl.
*G06N 20/00* (2019.01)

(52) U.S. Cl.
CPC ..................................... *G06N 20/00* (2019.01)

(58) Field of Classification Search
CPC ....................................................... G06N 20/00
See application file for complete search history.

(56) References Cited

U.S. PATENT DOCUMENTS

| | | | | |
|---|---|---|---|---|
| 9,008,840 | B1 * | 4/2015 | Ponulak ................. | G06N 3/049 700/250 |
| 2015/0278625 | A1 * | 10/2015 | Finkbeiner ............. | G02B 27/32 348/79 |
| 2016/0100803 | A1 * | 4/2016 | Korzinov ............... | G06N 5/022 600/301 |

FOREIGN PATENT DOCUMENTS

| | | | | |
|---|---|---|---|---|
| JP | H0519858 A | * | 1/1991 | ............ G05D 13/02 |
| JP | 5-19858 | | 1/1993 | |
| JP | 2008-312339 | | 12/2008 | |
| JP | 2009-104439 | | 5/2009 | |

(Continued)

OTHER PUBLICATIONS

Lee, D. H., et al, Mechanical vibration reduction control of two-mass permanent magnet synchronous motor using adaptive notch filter with fast Fourier transform analysis [online] [retrieved Sep. 15, 2021]. Retrieved from Internet:<https://digital-library.theiet.org/content/journals/10.1049/iet-epa.20> (Year: 2012).*

(Continued)

*Primary Examiner* — Miranda M Huang
*Assistant Examiner* — Bart I Rylander
(74) *Attorney, Agent, or Firm* — Wenderoth, Lind & Ponack, L.L.P.

(57) ABSTRACT

Setting of parameters that determine filter characteristics is facilitated. A machine learning device performs machine learning of optimizing coefficients of at least one filter provided in a servo control device that controls rotation of a motor. The filter is a filter for attenuating a specific frequency component. The coefficients of the filter are optimized on the basis of measurement information of a measurement device that measures at least one of an input/output gain and an input/output phase delay of the servo control device on the basis of an input signal of which the frequency changes and an output signal of the servo control device.

8 Claims, 10 Drawing Sheets

(56) References Cited

FOREIGN PATENT DOCUMENTS

WO    2018/151215    8/2018

OTHER PUBLICATIONS

Jayachitra, A., et al., Genetic Algorithm Based PID Controller Tuning Approach for Continuous Stirred Tank Reactor [online] [retrieved Sep. 15, 2021]. Retrieved from Internet:<https://downloads.hindawi.com/archive/2014/791230.pdf> (Year: 2014).*

Slavov, T., et al., Application of Genetic Algorithm to Tuning a PID Controller for Glucose Concentration Control, [online] [retrieved Sep. 15, 2021]. Retrieved from Internet:<http://www.wseas.us/journal/pdf/systems/2012/55-286.pdf> (Year: 2012).*

Segovia, V. et al, Measurement noise filtering for PID controllers [online] [retrieved Sep. 15, 2021]. Retrieved from Internet:<https://www.sciencedirect.com/science/article/pii/S0959152414000419> (Year: 2014).*

Cirrincione, M., et al, Current Harmonic Compensation by a Single-Phase Shunt Active Power Filter Controlled by Adaptive Neural Filtering [online] [retrieved Sep. 15, 2021]. Retrieved from Internet:<https://ieeexplore.ieee.org/abstract/document/4926181> (Year: 2009).*

Notification of Reasons for Refusal dated Sep. 23, 2020 in Japanese Patent Application No. 2018-187588.

* cited by examiner

MACHINE LEARNING DEVICE, CONTROL DEVICE, AND MACHINE LEARNING METHOD

This application is based on and claims the benefit of priority from Japanese Patent Application No. 2018-187588, filed on 2 Oct. 2018, the content of which is incorporated herein by reference.

BACKGROUND OF THE INVENTION

Field of the Invention

The present invention relates to a machine learning device that performs machine learning of optimizing coefficients of a filter provided in a servo control device that controls rotation of a motor of a machine tool, a robot, or an industrial machine and relates to a control device including the machine learning device and a machine learning method.

Related Art

A device that automatically adjusts characteristics of a filter is disclosed in Patent Document 3 and Patent Document 2, for example. Patent Document 1 discloses a servo actuator which includes a velocity feedback loop that controls the velocity of a motor and in which a notch filter means is inserted in the velocity feedback loop to remove mechanical resonance, the servo actuator including: a data collection means that acquires data indicating frequency response characteristics of the velocity feedback loop; a moving average means that calculates a moving average of the data acquired by the data collection means; a comparing means that compares the data obtained by the moving average means with the data obtained by the data collection means to extract the resonance characteristics of the velocity feedback loop; and a notch filter setting means that sets the frequency and the Q-value of the notch filter means on the basis of the resonance characteristics extracted by the comparing means.

Patent Document 2 discloses a servo actuator which superimposes an AC signal obtained by sweeping frequencies on a velocity command value signal during a tuning mode, detects an amplitude of a torque command value signal obtained from a velocity control unit as a result of the superimposition, and sets the frequency of the torque command value signal when the rate of change in the amplitude changes from positive to negative as a central frequency of a notch filter.

Patent Document 3 discloses a motor control device including a notch filter capable of changing a notch filter parameter including a notch frequency and a notch width, a vibration frequency estimation unit that estimates a vibration frequency, and a notch filter parameter setting unit that sets a frequency between the notch frequency of the notch filter and the vibration frequency as a new notch frequency and changes the notch width so that an original notch frequency component and an estimated frequency component are attenuated.

Patent Document 1: Japanese Unexamined Patent Application, Publication No. 2009-104439
Patent Document 2: Japanese Unexamined Patent Application, Publication No. H05-19858
Patent Document 3: Japanese Unexamined Patent Application, Publication No. 2008-312339

SUMMARY OF THE INVENTION

The servo actuator disclosed in Patent Document 1 adjusts the characteristics of the notch filter on the basis of frequency response characteristics of a velocity feedback loop. The servo actuator disclosed in Patent Document 2 adjusts the characteristics of the notch filter using a torque command value signal. In Patent Document 3, a frequency between the notch frequency of the notch filter and the estimated vibration frequency is set as a new notch frequency of the notch filter, and the notch width is changed so that the original notch frequency component and the estimated frequency component are attenuated whereby the characteristics of the notch filter are adjusted. However, when the characteristics of the notch filter are determined, it is necessary to determine a plurality of parameters such as a central frequency of a band to be removed and a bandwidth, and it is difficult to adjust these parameters to obtain an optimal value. Moreover, it is not possible to sufficiently suppress resonance unless these parameters are set appropriately, and a phase delay of a servo control unit may increase and a servo control performance may deteriorate.

An object of the present invention is to provide a machine learning device capable of setting optimal parameters of a filter associated with a servo control device, a control device including the machine learning device, and a machine learning method.

(1) A machine learning device according to the present invention is a machine learning device (for example, a machine learning unit 400 to be described later) that performs machine learning of optimizing coefficients of at least one filter provided in a servo control device (for example, a servo control unit 100 to be described later) that controls rotation of a motor (for example, a servo motor 150 to be described later), wherein the filter is a filter (for example, a filter 130 to be described later) for attenuating a specific frequency component, and the coefficients of the filter are optimized on the basis of measurement information of a measurement device (for example, a measurement unit 300 to be described later) that measures at least one of an input/output gain and an input/output phase delay of the servo control device on the basis of an input signal of which the frequency changes and an output signal of the servo control device.

(2) In the machine learning device according to (1), the input signal of which the frequency changes may be a sinusoidal wave of which the frequency changes, and the sinusoidal wave may be generated by a frequency generation device, and the frequency generation device may be provided inside or outside the servo control device.

(3) The machine learning device according to (1) or (2) may further include: a state information acquisition unit (for example, a state information acquisition unit 401 to be described later) that acquires state information including the measurement information and the coefficients of the filter; an action information output unit (for example, an action information output unit 403 to be described later) that outputs action information including adjustment information of the coefficients included in the state information to the filter; a reward output unit (for example, a reward output unit 4021 to be described later) that outputs a reward value of reinforcement learning based on the measurement information; and a value function updating unit (for example, a value function updating unit 4022 to be described later) that updates an action value function on the basis of the reward value output by the reward output unit, the state information, and the action information.

(4) In the machine learning device according to (3), the measurement information may include the input/output gain and the input/output phase delay, and the reward output unit may calculate a reward based on the input/output phase delay when the input/output gain of the servo control device included in the measurement information is equal to or smaller than the input/output gain of an input/output gain standard model calculated from the characteristics of the servo control device.

(5) In the machine learning device according to (4), the input/output gain of the standard model may be a constant value at a predetermined frequency or higher.

(6) In the machine learning device according to (4) or (5), the reward output unit may calculate the reward so that the input/output phase delay decreases.

(7) The machine learning device according to any one of (3) to (6) may further include: an optimization action information output unit (for example, an optimization action information output unit 405) that outputs adjustment information of the coefficients on the basis of a value function updated by the value function updating unit.

(8) A control device according to the present invention is a control device (for example, a control device 10 to be described later) including: a machine learning device (for example, a machine learning unit 400 to be described later) according to any one of (1) to (7); a servo control device (for example, a servo control unit 100 to be described later) that controls rotation of a motor having at least one filter for attenuating a specific frequency component; and a measurement device (for example, a measurement unit 300 to be described later) that measures at least one of an input/output gain and an input/output phase delay of the servo control device on the basis of an input signal of which the frequency changes and an output signal of the servo control device.

(9) A machine learning method according to the present invention is a machine learning method of a machine learning device (for example, a machine learning unit 400 to be described later) that performs machine learning of optimizing coefficients of at least one filter provided in a servo control device (for example, a servo control unit 100 to be described later) that controls rotation of a motor (for example, a servo motor 150 to be described later), wherein the coefficients of the filter are optimized on the basis of measurement information of a measurement device (for example, a measurement unit 300 to be described later) that measures at least one of an input/output gain and an input/output phase delay of the servo control device on the basis of an input signal of which the frequency changes and an output signal of the servo control device.

According to the present invention, it is possible to provide a machine learning device capable of setting optimal parameters of a filter associated with a servo control device, a control device including the machine learning device, and a machine learning method.

DETAILED DESCRIPTION OF THE INVENTION

Hereinafter, an embodiment of the present invention will be described in detail with reference to the drawings.

Figure 1:
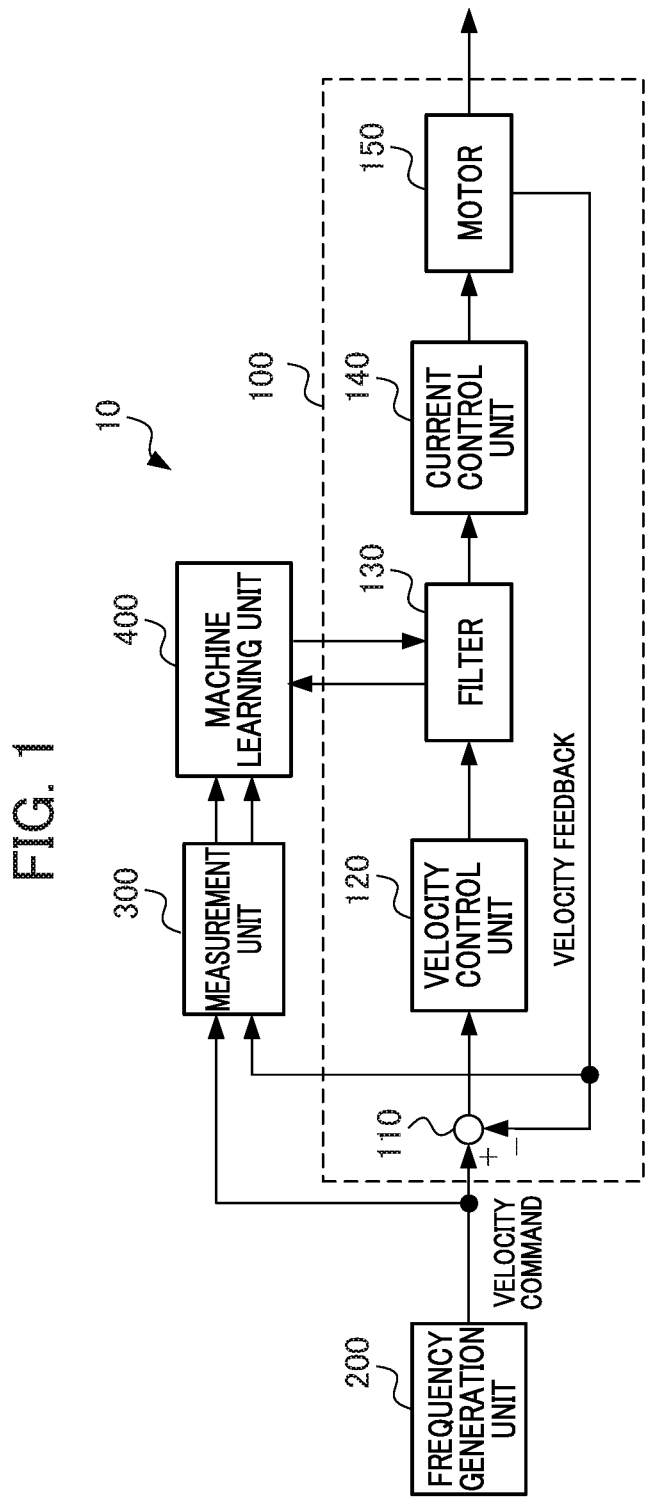
FIG. 1 is a block diagram illustrating a control device including a machine learning device according to an embodiment of the present invention.

FIG. 1 is a block diagram illustrating a control device including a machine learning device according to an embodiment of the present invention. A control target of a control device 10 is a machine tool, a robot, or an industrial machine, for example. The control device 10 may be provided as a part of a control target such as a machine tool, a robot, or an industrial machine.

The control device 10 includes a servo control unit 100, a frequency generation unit 200, a measurement unit 300, and a machine learning unit 400. The servo control unit 100 corresponds to a servo control device, the measurement unit 300 corresponds to a measurement device, and the machine learning unit 400 corresponds to a machine learning device. One or two or more of the frequency generation unit 200, the measurement unit 300, and the machine learning unit 400 may be provided in the servo control unit 100.

The servo control unit 100 includes a subtractor 110, a velocity control unit 120, a filter 130, a current control unit 140, and a servo motor 150. The subtractor 110, the velocity control unit 120, the filter 130, the current control unit 140, and the servo motor 150 form a velocity feedback loop.

The subtractor 110 calculates a difference between an input velocity command and a feedback detection velocity and outputs the difference to the velocity control unit 120 as a velocity error.

The velocity control unit 120 adds a value obtained by multiplying and integrating an integral gain K1v by the velocity error and a value obtained by multiplying a proportional gain K2v by the velocity error and outputs an addition result to the filter 130 as a torque command.

The filter 130 is a filter that attenuates a specific frequency component, and for example, a notch filter is used. A resonance point is present in a machine such as a machine tool driven by a motor, and resonance may increase in the servo control unit 100. The resonance can be reduced using the notch filter. The output of the filter 130 is output to the current control unit 140 as a torque command. Expression 1 (indicated by Math. 1 below) indicates a transfer function $F(s)$ of a notch filter as the filter 130. The parameter indicates coefficients $\omega_c$, $\tau$, and k. The coefficient k in Expression 1 is an attenuation coefficient, the coefficient $\omega_c$ is a central angular frequency, and the coefficient $\tau$ is a specific bandwidth. When the central frequency is fc and the bandwidth is fw, the coefficient $\omega_c$ is represented as $\omega_c=2\pi fc$, and the coefficient $\tau$ is represented as $\tau=fw/fc$.

$$F(s) = \frac{s^2 + 2k\tau\omega_c s + \omega_c^2}{s^2 + 2\tau\omega_c s + \omega_c^2} \qquad \text{[Math. 1]}$$

The current control unit 140 generates a current command for driving the servo motor 150 on the basis of a torque command and outputs the current command to the motor 150. A rotational angular position of the servo motor 150 is detected by a rotary encoder (not illustrated) provided in the servo motor 150 and the velocity detection value is input to the subtractor 110 as a velocity feedback. The servo control unit 100 is configured in this manner, and the control device 10 further includes the frequency generation unit 200, the measurement unit 300, and the machine learning unit 400 in order to machine-learn optimal parameters of the filter.

The frequency generation unit 200 outputs a sinusoidal signal to the subtractor 110 of the servo control unit 100 and the measurement unit 300 as a velocity command while changing a frequency.

Figure 2:
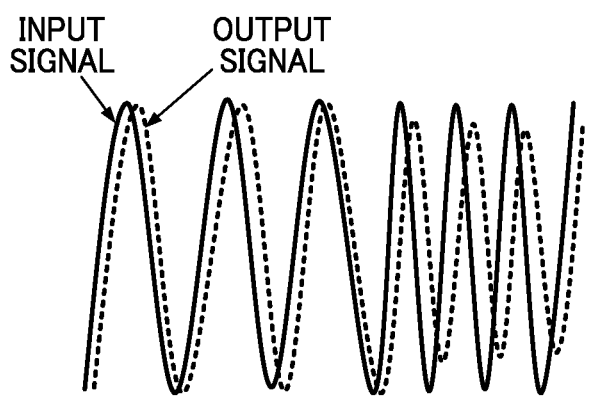
FIG. 2 is a diagram illustrating a velocity command serving as an input signal and a detection velocity serving as an output signal.
Figure 3:
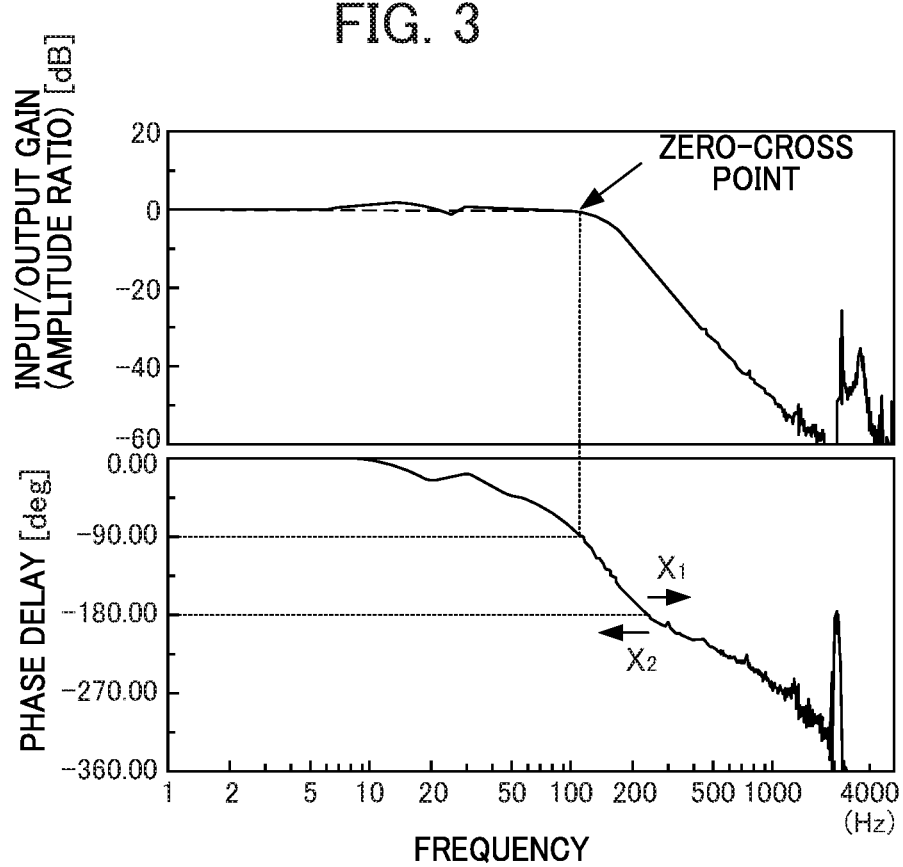
FIG. 3 is a diagram illustrating the frequency characteristics of an amplitude ratio and a phase delay between an input signal and an output signal.

The measurement unit 300 calculates an amplitude ratio (an input/output gain) and a phase delay between an input signal and an output signal for each of frequencies defined by the velocity command serving as the input signal using the velocity command (a sinusoidal wave) generated by the frequency generation unit 200 and a detection velocity (a sinusoidal wave) serving as the output signal output from a rotary encoder (not illustrated). FIG. 2 is a diagram illustrating a velocity command serving as an input signal and a detection velocity serving as an output signal. FIG. 3 is a diagram illustrating the frequency characteristics of an amplitude ratio and a phase delay between an input signal and an output signal. As illustrated in FIG. 2, the frequency of the velocity command output from the frequency generation unit 200 changes, and the frequency characteristics of an input/output gain (an amplitude ratio) and a phase delay as illustrated in FIG. 3 are obtained.

The machine learning unit 400 performs machine learning (hereinafter referred to as learning) on the coefficients $\omega_c$, $\tau$, and k of a transfer function of the filter 130 using the input/output gain (the amplitude ratio) and the phase delay output from the measurement unit 300. Although the learning of the machine learning unit 400 is performed before shipping, relearning may be performed after shipping. Hereinafter, the machine learning unit 400 will be described in further detail.

<Machine Learning Unit 400>

In the following description, although a case in which the machine learning unit 400 performs reinforcement learning is described, the learning performed by the machine learning unit 400 is not particularly limited to reinforcement learning, but the present invention can be also applied to a case in which the machine learning unit 400 performs supervised learning, for example.

Prior to description of respective functional blocks included in the machine learning device 400, first, a basic mechanism of reinforcement learning will be described. An agent (corresponding to the machine learning device 400 in the present embodiment) observes an environment state and selects a certain action. Then, the environment changes on the basis of the action. A certain reward is given according to the environmental change, and the agent learns selection (decision) for a better action. While supervised learning presents a complete correct answer, the reward in the reinforcement learning often presents a fragmental value based on change in a portion of the environment. Therefore, the agent learns to select an action so that the total reward in the future is maximized.

In this way, the reinforcement learning learns a method of learning a suitable action on the basis of the mutual effect of an action on the environment (that is, an action for maximizing the reward to be obtained in the future) by learning an action. This represents that, in the present embodiment, such an action that affects the future, for example, an action of selecting action information for suppressing vibration of a machine end, is obtained.

Here, although any learning method may be used as the reinforcement learning, in the description below, Q-learning which is a method of learning a value function Q(S,A) of selecting an action A under a certain state S of the environment will be described as an example. An object of the O-learning is to select an action A having the highest value function Q(S,A) as an optimal action among actions A that can be taken in a certain state S.

However, at an initial time at which the Q-learning starts, the correct value of the value Q(S,A) is not known at all for a combination of the state S and the action A. Therefore, the agent learns the correct value Q(S,A) by selecting various actions A under a certain state S and making a better selection of action based on rewards given for the selected actions A.

Since the agent wants to maximise the total reward obtained over the course of the future, the Q-learning aims to attain a relation of $Q(S,A)=E[\Sigma(\gamma^t)r_t]$ in the end. Here, E[ ] indicates an expected value, t indicates time, $\gamma$ is a parameter called a discount factor to be described later, $r_t$ is a reward at time t, and $\Sigma$ is the sum at time t. In this expression, the expected value is an expected value when the state was changed according to an optimal action. However, since it is unclear which action would be optimal in the process of Q-learning, reinforcement learning is performed while searching for an optimal action by performing various actions. An updating expression of such a value Q(S,A) can be represented by Expression 2 below (indicated as Math. 2 below)

$$Q(S_{t+1}, A_{t+1}) \leftarrow Q(S_t, A_t) + \alpha \left( r_{t+1} + \gamma \max_A Q(S_{t+1}, A) - Q(S_t, A_t) \right) \qquad \text{[Math. 2]}$$

In Expression 2, $S_t$ indicates a state of the environment at time t, and $A_t$ indicates an action at time t. By the action $A_t$, the state changes to $S_{t+1}$. $r_{t+1}$ indicates a reward obtained by the change in the state. Moreover, a term with max is a multiplication of the Q value by $\gamma$ when an action A having the highest Q value known at that moment is selected under the state $S_{t+1}$. Here, $\gamma$ is a parameter of $0<\gamma\leq1$ and is called a discount rate. Moreover, $\alpha$ is a learning coefficient and is in the range of $0<\alpha\leq1$.

Expression 2 indicates a method of updating a value $Q(S_t,A_t)$ of an action $A_t$ in a state St based on a reward $r_{t+1}$ that was offered in return when the action $A_t$ was performed. This updating expression indicates that if the value $\max_a Q(S_{t+1}, A)$ of the best action in the next state $S_{t+1}$ associated with an action $A_t$ is larger than the value $Q(S_t,A_t)$ of an action At in the state St, $Q(S_t,A_t)$ is increased, and if otherwise, $Q(S_t,A_t)$ is decreased. That is, the value of a certain action in a certain state approaches the value of the best action in the next state associated with the action. However, although this difference differs depending on the discount rate γ and the reward $r_{t+1}$, the value of the best action in a certain state basically propagates to the value of an action in a state previous to that state.

Here, a Q-learning method of creating a value function Q(S,A) table for all state-action pairs (S,A) to perform learning is known. However, it may take a considerably long time for the Q-learning to converge, since the number of states is too large to calculate the Q(S,A) values of all state-action pairs.

Thus, Q-learning may use an existing technique called a deep Q-network (DQN). Specifically, with DQN, the value of the value Q(S,A) is calculated by constructing a value function Q using an appropriate neural network and approximating the value function Q with the appropriate neural network by adjusting the parameters of the neural network. By using DQN, it is possible to shorten the time required for convergence of Q-learning. The details of DQN are disclosed in the Non-Patent Document below, for example.

NON-PATENT DOCUMENT

"Human-level control through deep reinforcement learning", Volodymyr Mnihl [online], [searched on Jan. 17, 2017], Internet <URL: http://files.davidqiu.com/research/nature14236.pdf>

The machine learning unit 400 performs the above-described Q-learning. Specifically, the machine learning unit 400 learns a value Q of selecting an action A of adjusting the values of the coefficients $ω_c$, τ, and k of the transfer function of the filter 130 associated with a state S, wherein the state S includes the values of the coefficients $ω_c$, τ, and k of the transfer function of the filter 130 and the input/output gain (the amplitude ratio) and the phase delay output from the measurement unit 300.

The machine learning unit 400 observes the state information S including the input/output gain (the amplitude ratio) and the phase delay for each frequency, obtained from the measurement unit 300 by driving the servo control unit 100 using the velocity command which is a sinusoidal wave of which the frequency changes on the basis of the coefficients $ω_c$, τ, and k of the transfer function of the filter 130 to determine the action A. The machine learning unit 400 receives a reward whenever the action A is executed. The machine learning unit 400 searches in trial-and-error manner for the optimal action A so that the total of the reward over the course of the future is maximized. By doing so, the machine learning unit 400 can select an optimal action A (that is, the optical coefficients $ω_c$, τ, and k of the transfer function of the filter 130) with respect to the state S including the input/output gain (the amplitude ratio) and the phase delay for each frequency, obtained from the servo control unit 100 using the velocity command which is a sinusoidal wave of which the frequency changes on the basis of the coefficients $ω_c$, τ, and k of the transfer function of the filter 130.

That is, the machine learning unit 400 can select such an action A (that is, the coefficients $ω_c$, τ, and k of the transfer function of the filter 130) that minimizes the vibration of a machine end generated when a machining program is executed by selecting such an action A that maximizes the value of Q among the actions A applied to the coefficients $ω_c$, τ, and k of the transfer function of the filter 130 associated with a certain state S on the basis of the value function Q learned by the machine learning unit 400.

Figure 4:
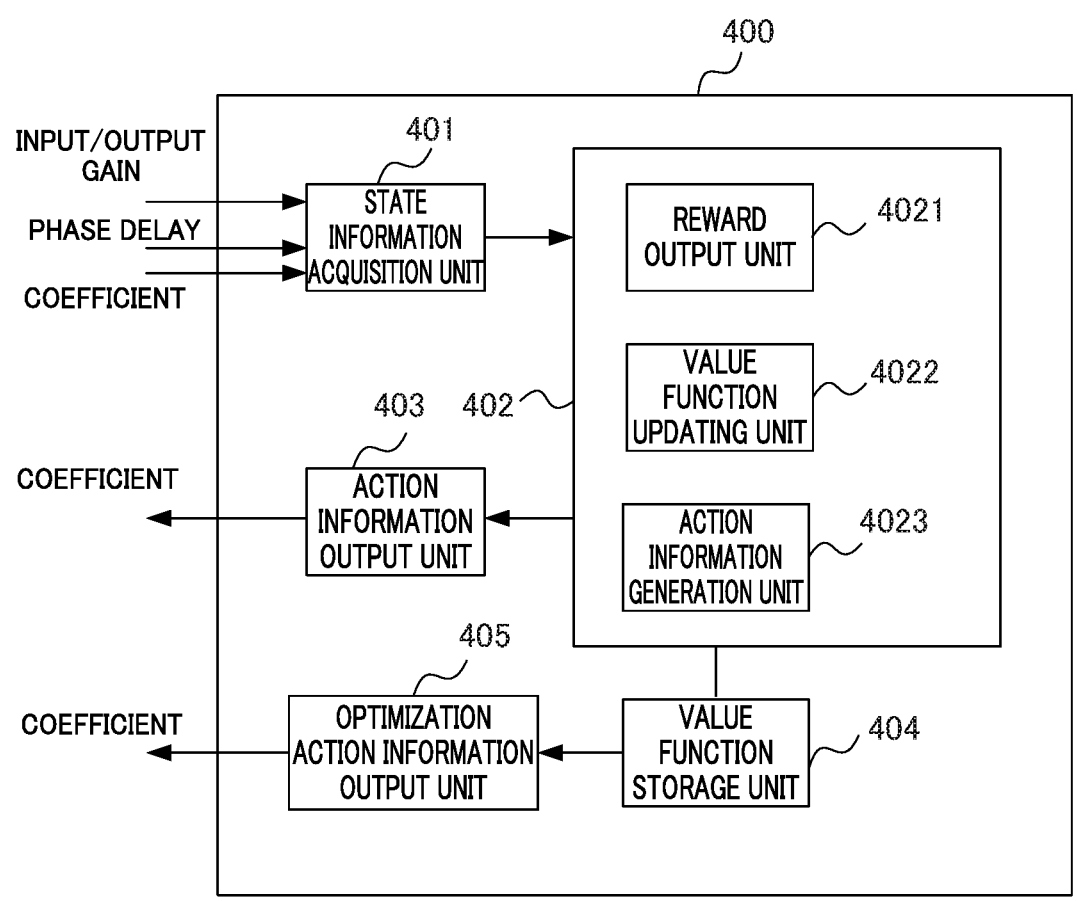
FIG. 4 is a block diagram illustrating a machine learning unit according to an embodiment of the present invention.

FIG. 4 is a block diagram illustrating the machine learning unit 400 according to an embodiment of the present invention. As illustrated in FIG. 4, in order to perform the reinforcement learning described above, the machine learning unit 400 includes a state information acquisition unit 401, a learning unit 402, an action information output unit 403, a value function storage unit 404, and an optimization action information output unit 405. The learning unit 402 includes a reward output unit 4021, a value function updating unit 4022, and an action information generation unit 4023.

The state information acquisition unit 401 acquires the state S including the input/output gain (the amplitude ratio) and the phase delay obtained by the servo motor 150 using the velocity command (the sinusoidal wave) from the measurement unit 300 on the basis of the coefficients $ω_c$, τ, and k of the transfer function of the filter 130. The state information S corresponds to an environment state S in the Q-learning. The state information acquisition unit 401 outputs the acquired state information S to the learning unit 402.

The coefficients $ω_c$, τ, and k of the transfer function of the filter 130 at a time point at which the Q-learning starts initially are generated by a user in advance. In the present embodiment, the initial setting values of the coefficients $ω_c$, τ, and k of the transfer function of the filter 130 created by the user are adjusted to optimal values by the reinforcement learning. When a machine tool is adjusted by an operator in advance, the adjusted values of the coefficients $ω_c$, τ, and k may be machine-learned as the initial values.

The learning unit 402 is a unit that learns the value Q(S,A) when a certain action A is selected under a certain environment state S.

The reward output unit 4021 is a unit that calculates a reward when the action A is selected under a certain state S. The reward output unit 4021 compares the input/output gain Gs measured when the coefficients $ω_c$, τ, and k of the transfer function of the filter 130 was corrected with the input/output gains Gb of the respective frequencies of a standard model set in advance. The reward output unit 4021 outputs a negative reward when the measured input/output gain Gs is larger than the input/output gain Gb of the standard model. On the other hand, when the measures input/output gain Gs is equal to or smaller than the input/output gain Gb of the standard model, the reward output unit 4021 outputs a positive reward when the phase delay decreases, outputs a negative reward when the phase delay increases, and outputs a zero reward when the phase delay does not change.

Figure 5:
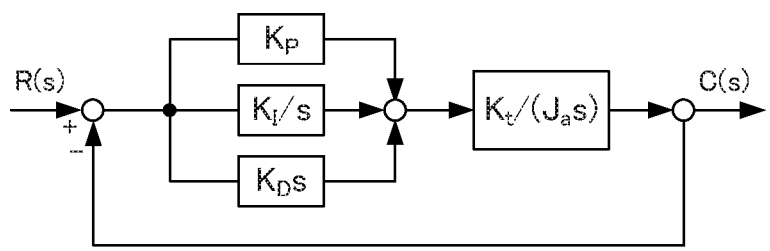
FIG. 5 is a block diagram serving as a model for calculating a standard model of an input/output gain.
Figure 6:
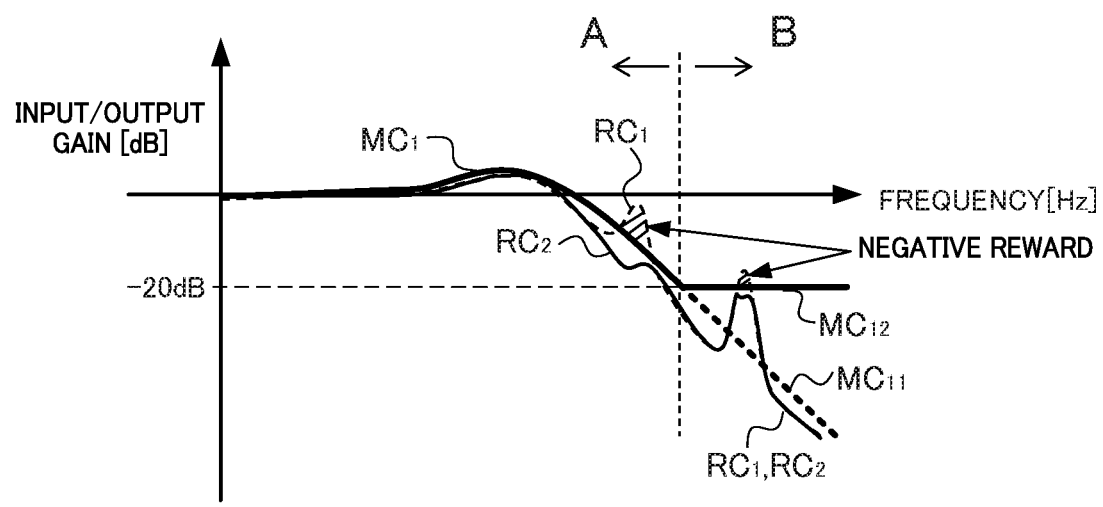
FIG. 6 is a characteristic diagram illustrating the frequency characteristics of an input/output gain of a servo control unit of a standard model and a servo control unit before and after learning.

First, an operation of the reward output unit 4021 outputting a negative reward when the measured input/output gain Gs is larger than the input/output gain Gb of the standard model will be described with reference to FIGS. 5 and 6. The reward output unit 4021 stores the standard model of the input/output gain. A standard model is a model of a servo control unit having ideal characteristics without resonance. The standard model can be calculated from inertia Ja, a torque constant $K_t$, a proportional gain $K_P$, an integral gain $K_I$, and a differential gain $K_D$ of the model illustrated in FIG. 5. The inertia Ja is an addition value of a motor inertia and a machine inertia. FIG. 6 is a characteristic diagram illustrating the frequency characteristics of the input/output gains of a servo control unit of a standard model and the servo control unit 100 before and after learning. As illustrated in the characteristic diagram of FIG. 6, the standard model has a region A which is a frequency region in which an input/output gain is equal to or larger than a certain input/output gain (for example, an ideal input/output gain of −20 dB) and a region B which is a frequency region in which an input/output gain is smaller than the certain input/output gain. In the region A of FIG. 6, an ideal input/output gain of the standard model is indicated by a curve $MC_1$ (a bold line). In the region B of FIG. 6, an ideal imaginary input/output gain of the standard model is indicated by a curve $MC_{11}$ (a bold broken line) and the input/output gain of the standard model is indicated by a straight line $MC_{12}$ (a bold line) as a constant value. In the regions A and B of FIG. 6, the curves of the input/output gains of the servo control unit before and after learning are indicated by curves $RC_1$ and $RC_2$, respectively.

In the region A, the reward output unit 4021 outputs a first negative reward when the curve $RC_1$ before learning of the measured input/output gain exceeds the curve $MC_1$ of the ideal input/output gain of the standard model. In the region B exceeding a frequency at which the input/output gain becomes sufficiently small, the influence on stability is small even when the curve $RC_1$ of the input/output gain before learning exceeds the curve $MC_{11}$ of the ideal imaginary input/output gain of the standard model. Therefore, in the region B, as described above, the input/output gain of the standard model uses the straight line $MC_{12}$ of the input/output gain (for example, −20 dB) of the constant value rather than the curve $MC_{11}$ of the ideal gain characteristics. However, the first negative value is output as a reward since there is a possibility to becoming unstable when the curve $RC_1$ of the measured input/output gain before learning exceeds the straight line $MC_{12}$ of the input/output gain of the constant value.

Next, an operation of the reward output unit 4021 determining a reward on the basis of the phase delay information when the measured input/output gain Gs is equal to or smaller than the input/output gain Gb of the standard model will be described. In the following description, a phase delay which is a state variable related to the state information S will be defined as D(S), and a phase delay which is a state variable related to a state S' changed from the state S by the action information A (corrections of the coefficients $\omega_c$, $\tau$, and k of the transfer function of the filter 130) will be defined as D(S').

The following three methods may be used, for example, as a method for the reward output unit 4021 determining a reward on the basis of the phase delay information. A first method is a method of determining a reward on the basis of whether a frequency at which the phase delay is 180° will increase, decrease, or remain the same when the state S changes to the state S'. In this example, although a case where the phase delay is 180° is employed, the angle is not particularly limited to 180° but another value may be used. For example, when a phase delay is represented as a phase diagram illustrated in FIG. 3, and the state S changes to the state S', the phase delay increases if the curve changes (in the direction $X_2$ in FIG. 3) so that the frequency at which the phase delay is 180° decreases. On the other hand, when the state S changes to the state S', the phase delay decreases if the curve changes (in the direction $X_1$ in FIG. 3) so that the frequency at which the phase delay is 180° increases.

Therefore, when the state S changes to the state S' and the frequency at which the phase delay is 180° decreases, it is defined that the phase delay D(S)<phase delay D(S'), and the reward output unit 4021 sets the reward to a second negative value. The absolute value of the second negative value is smaller than that of the first negative value. On the other hand, when the state S changes to the state S' and the frequency at which the phase delay is 180° increases, it is defined that phase delay D(S)>phase delay D(S'), and the reward output unit 4021 sets the reward to a positive value. Moreover, when the state S changes to the state S' and the frequency at which the phase delay is 180° remains the same, it is defined that phase delay D(S)=phase delay D(S'), and the reward output unit 4021 sets the reward to zero.

A second method is a method of determining a reward on the basis of whether an absolute value of a phase delay when the input/output gain crosses 0 dB will increase, decrease, or remain the same when the state S changes to the state S'. For example, in the state S, when the input/output gain is represented as a gain diagram illustrated in FIG. 3, a phase delay of the phase diagram illustrated in FIG. 3 corresponding to a point (hereinafter referred to as a "zero-cross point") crossing 0 dB is −90°.

When the state S changes to the state S' and the absolute value of the phase delay at the zero-cross point increases, it is defined that the phase delay D(S)<phase delay D(S'), and the reward output unit 4021 sets the reward to a second negative value. On the other hand, when the state S changes to the state S' and the absolute value of the phase delay at the zero-cross point decreases, it is defined that the phase delay D(S)>phase delay D(S'), and the reward output unit 4021 sets the reward to a positive value. Moreover, when the state S changes to the state S' and the absolute value of the phase delay at the zero-cross point remains the same, it is defined that the phase delay D(S)=phase delay D(S'), and the reward output unit 4021 sets the reward to zero.

A third method is a method of determining a reward on the basis of whether a phase margin will increase, decrease, or remain the same when the state S changes to the state S'. A phase margin indicates an angular distance of a phase from 180° when the gain is 0 dB. For example, in FIG. 3, since the phase is −90° when the gain is 0 dB, the phase margin is 90°. When the state S changes to the state S' and the phase margin decreases, it is defined that the phase delay D(S) <phase delay D(S'), and the reward output unit 4021 sets the reward to a second negative value. On the other hand, when the state S changes to the state S' and the phase margin increases, it is defined that the phase delay D(S)>phase delay D(S'), and the reward output unit 4021 sets the reward to a positive value. Moreover, when the state S changes to the state S' and the phase margin is not changed, it is defined that the phase delay D(S)=phase delay D(S'), and the reward output unit 4021 sets the reward to a zero.

Furthermore, the negative value when it is defined that the phase delay D(S') of the state S' after execution of the action A is larger than the phase delay D(S) of the previous state S may increase according to a proportion. For example, in the first method, the negative value may increase according to the degree of decrease in frequency. In contrast, the positive value when it is defined that the phase delay D(S') of the state S' after execution of the action A is smaller than the phase delay D(S) of the previous state S may increase according to a proportion. For example, in the first method, the positive value may increase according to the degree of increase in frequency.

The value function updating unit 4022 updates the value function Q stored in the value function storage unit 404 by performing Q-learning on the basis of the state S, the action A, the state S' when the action A was applied to the state S, and the value of the reward calculated in this manner. The update of the value function Q may be performed by online learning, batch learning, or mini-batch learning. Online learning is a learning method of applying a certain action A to a present state S and updating the value function Q immediately whenever the present state S transitions to a new state S'. Batch learning is a learning method of applying a certain action A to a present state S and repeated attaining transition from the state S to a new state S', collecting learning data, and updating the value function Q using all the collected learning data. Mini-batch learning is a learning method which is intermediate between online learning and batch learning and involves updating the value function Q whenever a certain amount of learning data is collected.

The action information generation unit 4023 selects the action A in the process of Q-learning with respect to the present state S. The action information generation unit 4023 generates action information A and outputs the generated action information A to the action information output unit 403 in order to perform an operation (corresponding to the action A of Q-learning) of correcting the coefficients $\omega_c$, $\tau$, and k of the transfer function of the filter 130 in the process of Q-learning. More specifically, the action information generation unit 4023 adds or subtracts the coefficients $\omega_c$, $\tau$, and k of the transfer function of the filter 130 included in the action A incrementally with respect to the coefficients $\omega_c$, $\tau$, and k of the transfer function of the filter 130 included in the state S, for example.

When the coefficients $\omega_c$, $\tau$, and k of the transfer function of the filter 130 are increased or decreased, the state S transitions to the state S', and a plus reward (a positive reward) is offered in return, the action information generation unit 4023 may select a policy of selecting such an action A' that further decreases the measured phase delay to be smaller than the previous phase delay such as incrementally increasing or decreasing the coefficients $\omega_c$, $\tau$, and k of the transfer function of the filter 130 similarly to the previous action as the next action A'.

In contrast, when a minus reward (a negative reward) is offered in return, the action information generation unit 4023 may select a policy of selecting such an action A' that further decreases the difference in input gain to be smaller than the previous difference when the measured input/output gain is larger than the input/output gain of the standard model or further decreases the measured phase delay to be smaller than the previous phase delay such as incrementally decreasing or increasing the coefficients $\omega_c$, $\tau$, and k of the transfer function of the filter 130 contrarily to the previous action as the next action A', for example.

Figure 7:
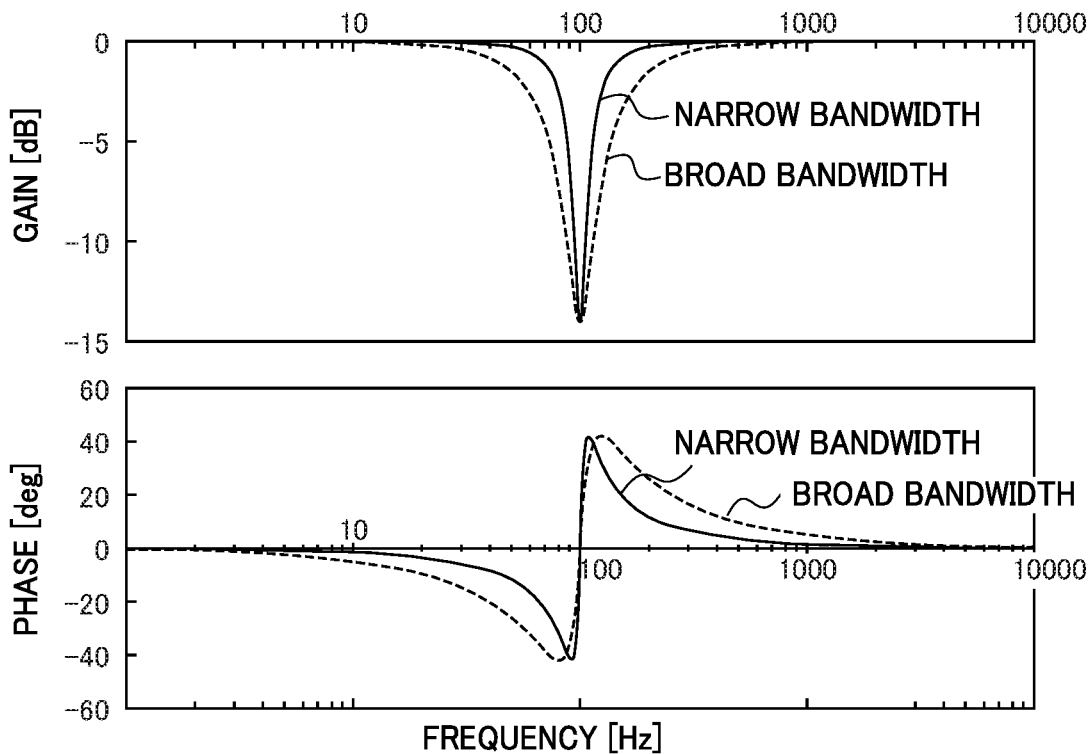
FIG. 7 is a characteristic diagram illustrating a relation between a bandwidth of a filter and a gain and a phase.
Figure 8:
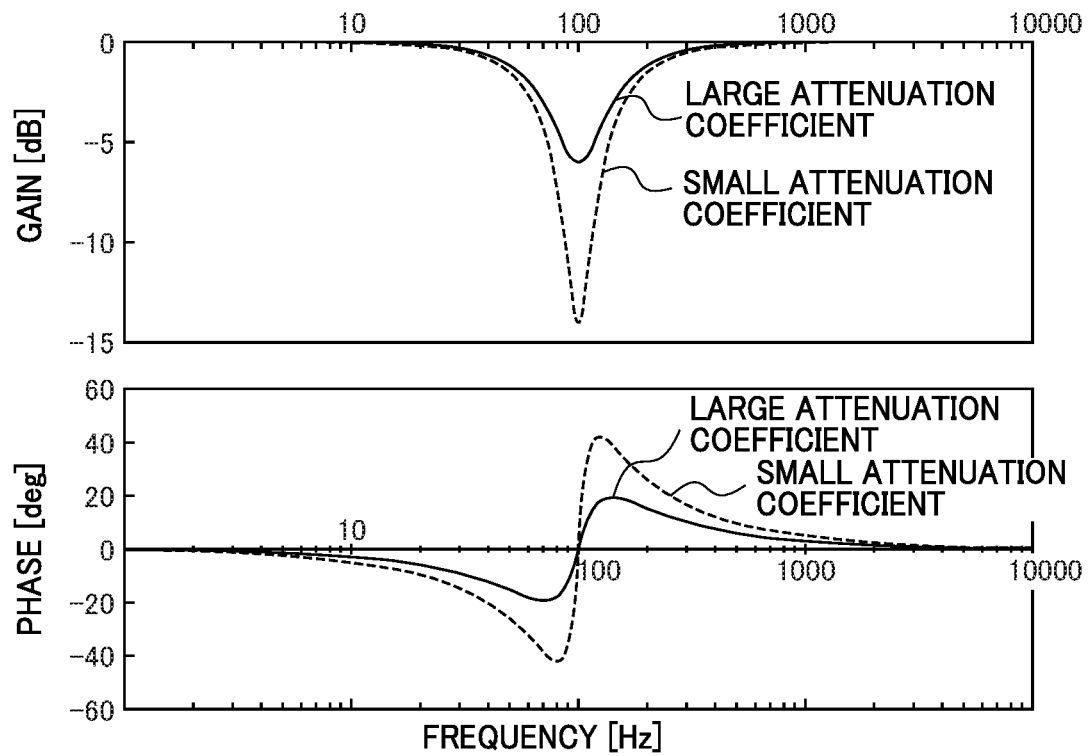
FIG. 8 is a characteristic diagram illustrating a relation between an attenuation coefficient of a filter and a gain and a phase.

All of the coefficients $\omega_c$, $\tau$, and k may be corrected and some coefficients may be corrected. It is easy to find the central frequency fc at which resonance occurs and it is easy to specify the central frequency fc. Therefore, the action information generation unit 4023 may generate the action information A and output the generated action information A to the action information output unit 403 in order to perform an operation of temporarily fixing the central frequency fc and correcting the bandwidth fw and the attenuation coefficient k (that is, fixing the coefficient $\omega_c$ (=2πfc) and correcting the coefficient $\tau$ (=fw/fc) and the attenuation coefficient k. As illustrated in FIG. 7, the characteristics (such as a gain and a phase) of the filter 130 change depending on the bandwidth fw of the filter 130. In FIG. 7, a broken line indicates a case where the bandwidth fw is large, and a solid line indicates a case where the bandwidth fw is small. Moreover, as illustrated in FIG. 8, the characteristics (such as a gain and a phase) of the filter 130 change depending on the attenuation coefficient k of the filter 130. In FIG. 8, a broken line indicates a case where the attenuation coefficient k is small, and a solid line indicates a case where the attenuation coefficient k is large.

The action information generation unit 4023 may select a policy of selecting the action A' according to a known method such as a greedy method of selecting an action A' having the highest value function Q(S,A) among the values of presently estimated actions A and an ε-greedy method of randomly selecting an action A' with a certain small probability ε and selecting an action A' having the highest value function Q(S,A) in other cases.

The action information output unit 403 is a unit that transmits the action information A output from the learning unit 402 to the filter 130. As described above, the filter 130 finely adjusts the present state S (that is, the coefficients $\omega_c$, $\tau$, and k set presently) on the basis of the action information to thereby transition to the next state S' (that is, the corrected coefficients of the filter 130).

The value function storage unit 404 is a storage device that stores the value function Q. The value function Q may be stored as a table (hereinafter referred to as an action value table) for each state S and each action A, for example. The value function Q stored in the value function storage unit 404 is updated by the value function updating unit 4022. Moreover, the value function Q stored in the value function storage unit 404 may be shared with other machine learning units 400. When the value function Q is shared by a plurality of machine learning units 400, since reinforcement learning can be performed in a manner of being distributed to the respective machine learning units 400, it is possible to improve the reinforcement learning efficiency.

The optimization action information output unit 405 generates the action information A (hereinafter referred to as "optimization action information") for causing the filter 130 to perform an operation of maximizing the value Q(S,A) on the basis of the value function Q updated by the value function updating unit 4022 performing the Q-learning. More specifically, the optimization action information output unit 405 acquires the value function Q stored in the value function storage unit 404. As described above, the value function Q is updated by the value function updating unit 4022 performing the Q-learning. The optimization action information output unit 405 generates the action information on the basis of the value function Q and outputs the generated action information to the filter 130. The optimization action information includes information that corrects the coefficients $\omega_c$, $\tau$, and k of the transfer function of the filter 130 similarly to the action information that the action information output unit 403 outputs in the process of Q-learning.

In the filter 130, the coefficients $\omega_c$, $\tau$, and k of the transfer function are corrected on the basis of the action information. With the above-described operations, the machine learning unit 400 can optimize the coefficients $\omega_c$, $\tau$, and k of the transfer function of the filter 130 and operate so that vibration of a machine end is suppressed. As described above, it is possible to simplify adjustment of the parameters of the filter 130 using the machine learning unit 400 according to the present invention.

Hereinabove, the functional blocks included in the control device 10 have been described. In order to realize these functional blocks, the control device 10 includes an arithmetic processing unit such as a central processing unit (CPU). The control device 10 further includes an auxiliary storage device such as a hard disk drive (HDD) for storing various control programs such as application software or an operating system (OS) and a main storage device such as a random access memory (RAM) for storing data temporarily required when the arithmetic processing device executes a program.

In the control device 10, the arithmetic processing device reads an application and an OS from the auxiliary storage device, and develops the read application software and OS in the main storage device to perform arithmetic processing on the basis of the read application software and OS. The arithmetic processing device also controls various types of hardware provided in each device based on the arithmetic result. In this way, the functional blocks of the present embodiment are realized. That is, the present embodiment can be realized by cooperation of hardware and software.

Since the machine learning unit 400 involves a large amount of computation associated with the machine learning, graphics processing units (GPUs) may be mounted on a personal computer and be used for arithmetic processing associated with the machine learning using a technique called general-purpose computing on graphics processing units (GPGPUs). In this way, high velocity processing can be performed. Furthermore, in order for the machine learning unit 400 to perform higher velocity processing, a computer cluster may be built using a plurality of computers equipped with such GPUs, and the plurality of computers included in the computer cluster may perform parallel processing.

Figure 9:
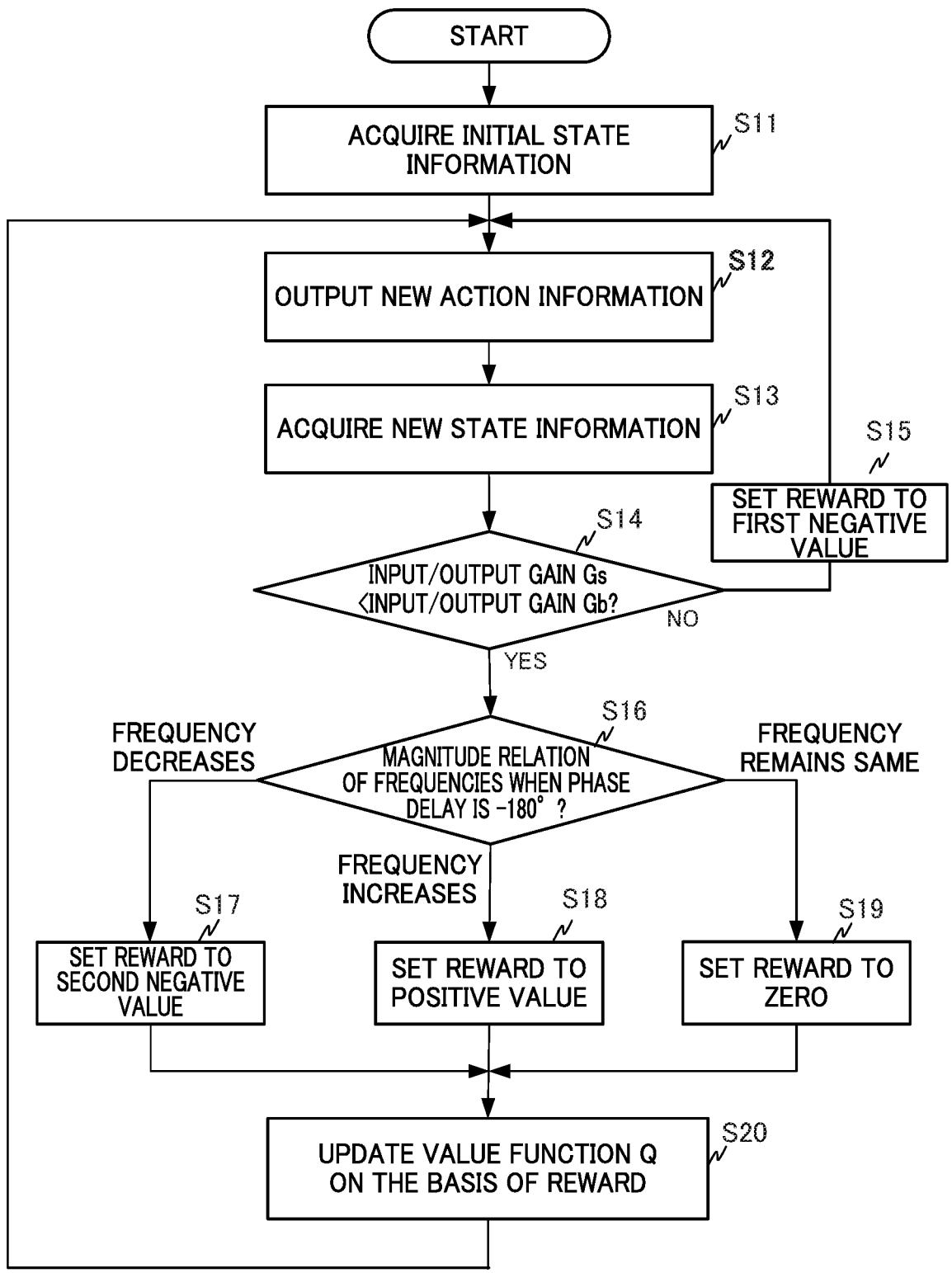
FIG. 9 is a flowchart illustrating an operation of a machine learning unit during Q-learning according to the present embodiment.

Next, an operation of the machine learning unit 400 during Q-learning according to the present embodiment will be described with reference to the flowcharts of FIG. 9.

In step S11, the state information acquisition unit 401 acquires the initial state information S from the servo control unit 100 and the frequency generation unit 200. The acquired state information S is output to the value function updating unit 4022 and the action information generation unit 4023. As described above, the state information S is information corresponding to a state in Q-learning.

The input/output gain (the amplitude ratio) $Gs(S_0)$ and the phase delay $D(S_0)$ in the state $S_0$ at a time point at which Q-learning starts initially are obtained from the measurement unit 300 by driving the servo control unit 100 using the velocity command which is a sinusoidal wave of which the frequency changes. The velocity command and the detection velocity are input to the measurement unit 300, and the input/output gain (the amplitude ratio) $Gs(S_0)$ and the phase delay $D(S_0)$ output from the measurement unit 300 are input to the state information acquisition unit 401 as initial state information. The initial values of the coefficients $\omega_c$, $\tau$, and k of the transfer function of the filter 130 are generated in advance by a user, and the initial values of the coefficients $\omega_c$, $\tau$, and k are transmitted to the state information acquisition unit 401 as the initial state information.

In step S12, the action information generation unit 4023 generates new action information A and outputs the generated new action information A to the filter 130 via the action information output unit 403. The action information generation unit 4023 outputs the new action information A on the basis of the above-described policy. The servo control unit 100 having received the action information A drives the servo motor 127 using the velocity command which is the sinusoidal wave of which the frequency changes according to the state S' obtained by correcting the coefficients $\omega_c$, $\tau$, and k of the transfer function of the filter 130 associated with the present state S on the basis of the received action information. As described above, the action information corresponds to the action A in Q-learning.

In step S13, the state information acquisition unit 401 acquires the input/output gain (the amplitude ratio) Gs(S') and the phase delay D(S') in the new state S' and the coefficients $\omega_c$, $\tau$, and k of the transfer function from the filter 130 as new state information. The acquired new state information is output to the reward output unit 4021.

In step S14, the reward output unit 4021 determines whether the input/output gain Gs(S') of each frequency in the state S' are equal to or smaller than the input/output gain Gb of each frequency of the standard model. When the input/output gain Gs(S') of each frequency is larger than the input/output gain Gb of each frequency of the standard model (step S14: NO), the reward output unit 4021 sets the reward to a first negative value in step S15 and returns to step S12.

When the input/output gain Gs(S') of each frequency in the state S' is equal to or smaller than the input/output gain Gb of each frequency of the standard model (step S14: YES), the reward output unit 4021 outputs a positive reward when the phase delay D(S') is smaller than the phase delay D(S), outputs a negative value when the phase delay D(S') is larger than the phase delay D(S), and outputs a zero reward when the phase delay D(S') remains the same as the phase delay D(S). Although three methods, for example, may be used as a method for determining the reward so that the phase delay decreases as described above, a case in which the first method is adopted will be described. In step S16, specifically, when the state S changes to the state S' in the phase diagram in FIG. 3, for example, and the frequency at which the phase delay is 180° decreases, it is defined that phase delay D(S)<phase delay D(S'), and the reward output unit 4021 sets the reward to a second negative value in step S17. The absolute value of the second negative value is smaller than that of the first negative value. When the state S changes to the state S' and the frequency at which the phase delay is 180° increases, it is defined that phase delay D(S)>phase delay D(S'), and the reward output unit 4021 sets the reward to a positive value in step S18. Moreover, when the state S changes to the state S' and the frequency at which the phase delay is 180° remains the same, it is defined that phase delay D(S)=phase delay D(S'), and the reward output unit 4021 sets the reward to zero in step S19.

When any one of steps S17, S18, and S19 ends, the value function updating unit 4022 updates the value function Q stored in the value function storage unit 404 on the basis of the value of the reward calculated in any one of the steps in step S20. After that, the flow returns to step S11 again, and the above-described process is repeated, whereby the value function Q settles to an appropriate value. The process may end on condition that the above-described process is repeated for a predetermined period. Although online updating is exemplified in step S20, batch updating or mini-batch updating may be performed instead of the online updating.

In the present embodiment, due to the operations described with reference to FIG. 9, it is possible to obtain an appropriate value function for adjustment of the coefficients $\omega_c$, $\tau$, and k of the transfer function of the filter 130 and to simplify optimization of the coefficients $\omega_c$, $\tau$, and k of the transfer function of the filter 130 using the machine learning unit 400. Next, an operation during generation of the optimization action information by the optimization action information output unit 405 will be described with reference to the flowchart of FIG. 10. First, in step S21, the optimization action information output unit 405 acquires the value function Q stored in the value function storage unit 404. As described above, the value function Q is updated by the value function updating unit 4022 performing the Q-learning.

In step S22, the optimization action information output unit 405 generates the optimization action information on the basis of the value function Q and outputs the generated optimization action information to the filter 130.

Figure 10:
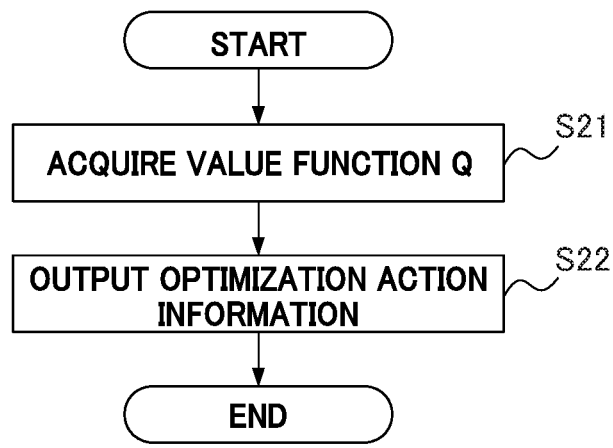
FIG. 10 is a flowchart illustrating an operation of an optimization action information output unit of a machine learning unit according to an embodiment of the present invention.

In the present embodiment, due to the operations described with reference to FIG. 10, it is possible to generate the optimization action information on the basis of the value function Q obtained by the learning of the machine learning unit 400, simplify adjustment of the coefficients $\omega_c$, $\tau$, and k of the transfer function of the filter 130 set presently on the basis of the optimization action information, suppress vibration of a machine end, and improve the quality of a machining surface of a work.

The components included in the control device may be realized by hardware, software or a combination thereof. The servo control method performed by cooperation of the components included in the control device described above also may be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). Moreover, the programs may be supplied to a computer via various types of transitory computer readable media.

The above-described embodiment is a preferred embodiment of the present invention. However, the scope of the present invention is not limited to the embodiment only, and the present invention can be embodied in various modifications without departing from the spirit of the present invention.

Figure 11:
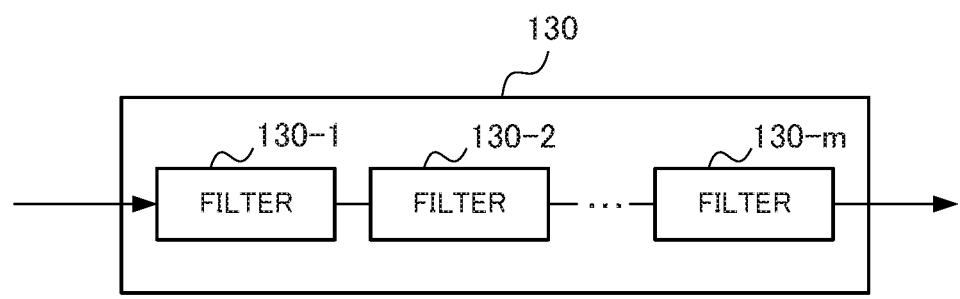
FIG. 11 is a block diagram illustrating an example in which a plurality of filters are connected directly to form a filter.

In the above-described embodiment, although a case in which the machine driven by the servo motor 150 has one resonance point has been described, the machine may have a plurality of resonance points. When the machine has a plurality of resonance points, a plurality of filters may be provided so as to correspond to the respective resonance points and be connected in series whereby all resonances can be attenuated. FIG. 11 is a block diagram illustrating an example in which a plurality of filters are connected in series to form a filter. In FIG. 11, when there are m (m is a natural number of 2 or more) resonance points, the filter 130 is formed by connecting m filters 130-1 to **130-*m* in series. Optimal values for attenuating resonance points are calculated by performing machine learning sequentially with respect to the coefficients $\omega_c$, $\tau$, and k of the m filters 130-1 to 130-*m***.

The control device may have the following configuration other than the configuration illustrated in FIG. 1.

<Modification in which Machine Learning Unit is Provided Outside Servo Control Unit>

Figure 12:
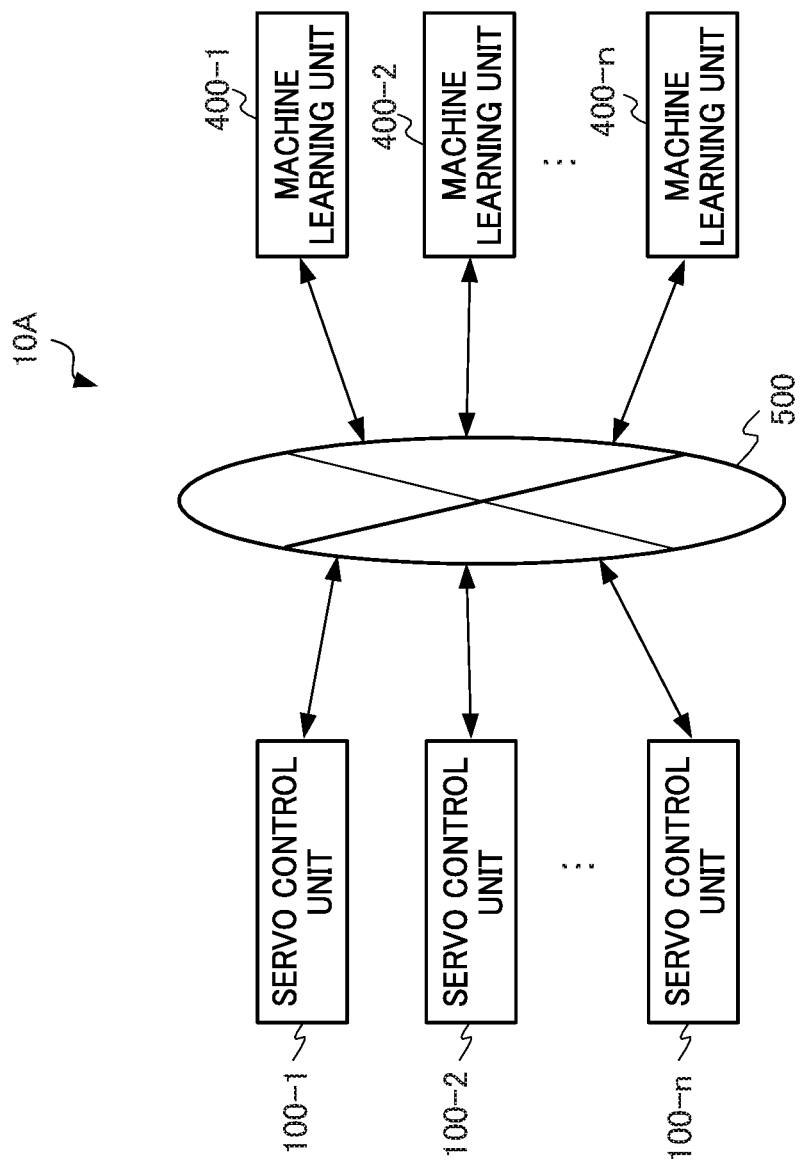
FIG. 12 is a block diagram illustrating another configuration example of a control device.

FIG. 12 is a block diagram illustrating another configuration example of the control device. A difference between a control device 10A illustrated in FIG. 12 and the control device 10 illustrated in FIG. 1 is that n (n is a natural number of 2 or more) servo control units 100A-1 to 100A-n are connected to n machine learning units 400-1 to **400-*n* via a network 500 and each have the frequency generation unit 200 and the measurement unit 300. The machine learning units 400A-1 to 400A-n have the same configuration as the machine learning unit 400 illustrated in FIG. 4. The servo control units 100A-1 to 100A-n each correspond to the servo control device, and the machine learning units 400A-1 to 400A-n each correspond to the machine learning device. One or both of the frequency generation unit 200 and the measurement unit 300 may be provided outside the servo control units 100A-1 to 100A-n**.

Here, the servo control unit 100A-1 and the machine learning unit 400A-1 are communicably connected as a one-to-one correlation. The servo control units 100A-2 to 100A-n and the machine learning units 400A-2 to 400A-n are connected similarly to the servo control unit 100A-1 and the machine learning unit 400A-1. Although n pairs of the servo control units 100A-1 to 100A-n and the machine learning units 400A-1 to 400A-n are connected via the network 500 in FIG. 11, the n pairs of the servo control unit 100A-1 to 100A-n and the machine learning units 400A-1 to 400A-n may be connected directly such that the servo control unit and the machine learning unit of each pair are connected directly by a connection interface. A plurality of n pairs of the servo control unit 100A-1 to 100A-n and the machine learning units 400A-1 to 400A-n may be provided in the same plant, for example, and may be provided in different plants.

The network 500 is a local area network (LAN) constructed in a plant, the Internet, a public telephone network, or a combination thereof, for example. A specific communication scheme of the network 500, whether the network uses a cable connection or a wireless connection, and the like are not particularly limited.

<Freedom in System Configuration>

In the embodiment described above, the servo control unit 100A-1 to 100A-n and the machine learning units 400A-1 to 400A-n are communicably connected as a one-to-one correlation. However, for example, one machine learning unit may be communicably connected to a plurality of servo control units via the network 500 and the machine learning of the respective servo control units may be performed. In this case, a distributed processing system may be adopted, in which respective functions of one machine learning device are distributed to a plurality of servers as appropriate. The functions of one machine learning unit may be realized by utilizing a virtual server function or the like on a cloud.

When there are n machine learning units 400A-1 to 400A-n corresponding to n servo control unit 100A-1 to 100A-n of the same type name, the same specification, or the same series, the machine learning units 400A-1 to 400A-n may be configured to share learning results in the machine learning units 400A-1 to 400A-n. By doing so, a more optimal model can be constructed.

EXPLANATION OF REFERENCE NUMERALS

10, 10A: Control device
100, 100-1 to **100-*n***: Servo control unit
110: Subtractor
120: Velocity control unit
130: Filter
140: Current control unit
150: Servo motor
200: Frequency generation unit
300: Measurement unit
400: Machine learning unit.
400A-1 to 400A-n: Machine learning unit
401: State information acquisition unit
402: Learning unit
403: Action information output unit

404: Value function storage unit
405: Optimization action information output unit
500: Network

What is claimed is:

1. A machine learning device that performs machine learning of optimizing coefficients of at least one filter provided in a servo control device that controls rotation of a motor, wherein
the filter is a filter for attenuating a specific frequency component,
the machine learning device comprising:
a state information acquisition unit that acquires state information including measurement information of a measurement device that measures an input/output gain and an input/output phase delay of the servo control device on the basis of an input signal of which the frequency changes and an output signal of the servo control device, and the coefficients of a transfer function of the filter;
an action information output unit that outputs action information including adjustment information of the coefficients of the transfer function included in the state information;
a reward output unit that outputs a reward value of reinforcement learning based on the measurement information; and
a value function updating unit that updates an action value function on the basis of the reward value output by the reward output unit, the state information, and the action information,
wherein the measurement information includes the input/output gain and the input/output phase delay, and
the reward output unit calculates a reward based on the input/output gain of the servo control device and the input/output phase delay included in the measurement information, wherein the reward output unit calculates a negative value as a reward when the input/output gain of the servo control device exceeds the input/output gain of a standard model and the reward output unit calculates a reward based on the input/output phase delay, when the input/output gain of the servo control device is equal to or smaller than the input/output gain of the standard model, wherein the standard model is calculated from inertia, a torque constant, a proportional gain, an integral gain, and a differential gain of the servo control device, and the standard model is a model of the servo control device having ideal characteristics without resonance.

2. The machine learning device according to claim 1, wherein the input signal of which the frequency changes is a sinusoidal wave of which the frequency changes, and
the sinusoidal wave is generated by a frequency generation device, and the frequency generation device is provided inside or outside the servo control device.

3. The machine learning device according to claim 1, wherein the input/output gain of the standard model is a constant value at a predetermined frequency or higher.

4. The machine learning device according to claim 1, wherein, when the reward output unit outputs a positive or negative reward value on the basis of a magnitude correlation between the input/output phase delay of the servo control device including the filter for which the coefficient was adjusted and the input/output phase delay of the servo control device including the filter prior to adjustment of the coefficient, the action information output unit outputs the action information such that the input/output phase delay of the service control device including the filter for which the coefficient was adjusted becomes smaller than the input/output phase delay of the servo control device including the filter prior to adjustment of the coefficient.

5. The machine learning device according to claim 1, further comprising: an optimization action information output unit that outputs adjustment information of the coefficients on the basis of a value function updated by the value function updating unit.

6. A control device comprising: a machine learning device according to claim 1;
a servo control device that controls rotation of a motor having at least one filter for attenuating a specific frequency component; and
a measurement device that measures an input/output gain and an input/output phase delay of the servo control device on the basis of an input signal of which the frequency changes and an output signal of the servo control device.

7. A machine learning method of a machine learning device that performs machine learning of optimizing coefficients of at least one filter provided in a servo control device that controls rotation of a motor, the machine learning method comprising the steps of:
acquiring state information including measurement information of a measurement device that measures an input/output gain and an input/output phase delay of the servo control device on the basis of an input signal of which the frequency changes and an output signal of the servo control device, and the coefficients of a transfer function of the filter;
outputting action information including adjustment information of the coefficients of the transfer function included in the state information;
outputting a reward value of reinforcement learning based on the measurement information;
updating an action value function on the basis of the reward value output, the state information, and the action information,
wherein the measurement information includes the input/output gain and the input/output phase delay; and
calculating a reward based on the input/output gain of the servo control device and the input/output phase delay included in the measurement information, calculating a negative value as a reward when the input/output gain of the servo control device exceeds the input/output gain of a standard model and calculating a reward based on the input/output phase delay, when the input/output gain of the servo control device is equal to or smaller than the input/output gain of the standard model, wherein the standard model is calculated from inertia, a torque constant, a proportional gain, an integral gain, and a differential gain of the servo control device, and the standard model is a model of the servo control device having ideal characteristics without resonance.

8. The machine learning device according to claim 1, wherein the coefficients of a transfer function of the filter includes an attenuation coefficient, central angular frequency, and a specific bandwidth.

* * * * *